US009282209B2

(12) United States Patent
Nagai (10) Patent No.: US 9,282,209 B2
(45) Date of Patent: Mar. 8, 2016

(54) IMAGE READING DEVICE VARYING CONVEYANCE TORQUE BASED ON TYPE OF SHEET

(75) Inventor: Takuya Nagai, Aichi (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 0 days.

(21) Appl. No.: 13/618,663

(22) Filed: Sep. 14, 2012

(65) Prior Publication Data

US 2013/0083374 A1    Apr. 4, 2013

(30) Foreign Application Priority Data

Sep. 30, 2011    (JP) .................................. 2011-215841

(51) Int. Cl.
| | |
|---|---|
| H04N 1/04 | (2006.01) |
| H04N 1/00 | (2006.01) |
| H04N 1/12 | (2006.01) |
| H04N 1/193 | (2006.01) |

(52) U.S. Cl.
CPC ....... *H04N 1/00652* (2013.01); *H04N 1/00694* (2013.01); *H04N 1/00724* (2013.01); *H04N 1/00779* (2013.01); *H04N 1/0049* (2013.01); *H04N 1/00477* (2013.01); *H04N 1/12* (2013.01); *H04N 1/193* (2013.01); *H04N 2201/0081* (2013.01)

(58) Field of Classification Search
CPC ....... H04N 1/193; H04N 1/12; H04N 1/0057; H04N 1/121; H04N 2201/00631; H04N 1/00681; H04N 2201/00766; H04N 2201/00756; H04N 1/1017; H04N 1/00652; H04N 1/00694; H04N 1/00724; H04N 1/00779; H04N 1/00477; H04N 1/0049
See application file for complete search history.

(56) References Cited

U.S. PATENT DOCUMENTS

| | | | | |
|---|---|---|---|---|
| 5,181,705 | A | * | 1/1993 | Ueda et al. .................... 271/3.15 |
| 7,828,279 | B2 | * | 11/2010 | Hammen ...................... 271/3.14 |
| 2006/0067777 | A1 | * | 3/2006 | Koga et al. .................... 400/624 |

FOREIGN PATENT DOCUMENTS

| | | | | |
|---|---|---|---|---|
| JP | 02089743 | A | * | 3/1990 |
| JP | 05-14640 | A | | 1/1993 |
| JP | 7-277553 | A | | 10/1995 |
| JP | 07277553 | A | * | 10/1995 |
| JP | 11-116094 | A | | 4/1999 |

OTHER PUBLICATIONS

Official Action dated Apr. 21, 2015 received from the Japanese Patent Office in related JP 2011-215841 together with English language translation.

\* cited by examiner

*Primary Examiner* — Cheukfan Lee
(74) *Attorney, Agent, or Firm* — Scully Scott Murphy & Presser; Paul Esatto (57) ABSTRACT

An image reading device includes a sheet setting portion, a reading unit, a detecting unit, and a controller. The conveying unit is configured to convey a sheet in a conveying direction at a first velocity. The reading unit is configured to read the sheet at a reading position. The detecting unit is configured to detect the sheet at a detection position upstream of the reading position in the conveying direction. The controller is configured to control the conveying unit to initiate conveyance of sheet, and configured to control the reading unit to start reading the sheet when the sheet is detected. The controller controls the conveying unit to convey the sheet at a second velocity slower than the first velocity when the sheet is not detected after a prescribed period of time has elapsed since the conveying unit initiates the conveyance of sheet.

9 Claims, 6 Drawing Sheets

IMAGE READING DEVICE VARYING CONVEYANCE TORQUE BASED ON TYPE OF SHEET

CROSS REFERENCE TO RELATED APPLICATION

This application claims priority from Japanese Patent Application No. 2011-215841 filed Sep. 30, 2011. The entire content of this priority application is incorporated herein by reference.

TECHNICAL FIELD

The present invention relates to an image-reading device that reads a sheet while conveying the same and that varies a conveyance torque based on the type of sheet.

BACKGROUND

Image-reading devices that simultaneously convey and read sheets are known in the art. These devices are sometimes required to read a sheet that is substantially thick and stiff, such as a plastic card. The torque required to convey such sheets (hereinafter referred to as "conveyance torque") is greater than that required to convey sheets of normal paper. One conventional technique known in the art increases the electric current applied to a conveying motor in order to increase the motor's output torque, and decreases the electric current applied to the motor in order to decrease the output torque.

SUMMARY

However, increasing the electric current applied to the conveying motor to increase the conveyance torque on a sheet of original also increases the amount of power consumed and heat generated by the image-reading device. Consequently, the conveying motor used in the image-reading device must have a relatively high rated current and heat resistance, leading to such problems as higher device costs.

In view of the foregoing, it is an object of the present invention to provide an image-reading device capable of adjusting conveyance torque for conveying a sheet of the original using a technique that can suppress increases in the amount of power consumed and heat generated by the device.

In order to attain the above and other objects, the invention provides an image reading device. The image reading device includes a sheet setting portion, reading unit, detecting unit, and controller. A sheet is set on the sheet setting portion. The conveying unit is configured to convey the sheet along a conveying path in a conveying direction at a first predetermined velocity. The conveying path has a reading position and a detection position upstream of the reading position in the conveying direction. The reading unit is configured to read the sheet being conveyed by the conveying unit at the reading position. The detecting unit is configured to detect the sheet passing past the detection position. The controller is configured to control the conveying unit to initiate conveyance of the sheet and configured to control the reading unit to start reading the sheet when the detecting unit detects the sheet. The controller is further configured to control the conveying unit to convey the sheet at a second predetermined velocity slower than the first predetermined velocity when the detecting unit fails to detect the sheet after a prescribed period of time has elapsed since the conveying unit initiates the conveyance of the sheet, the prescribed period of time being set based on a duration in which the conveyance of the sheet from the sheet setting portion to the detection position at the first predetermined velocity.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a first embodiment will be described while referring to FIGS. 1 through 3.

1. Mechanical Structure of an Image-Reading Device

The image-reading device 1 includes a sheet tray 2, a main body 3, and discharge trays 4A and 4B. The image-reading device 1 is a sheet-fed scanner that conveys sheets G of an original set on and loaded in the sheet tray 2 to the discharge tray 4 while reading the conveyed sheets G using a contact image sensor (CIS) 24 provided in the main body 3.

The main body 3 defines a paper-conveying path 22 linking the sheet tray 2 to the discharge tray 4. The paper-conveying path 22 has an ambient portion provided with a feeding roller 20, a separating pad 21, three pairs of conveying rollers 23, the CIS 24, a front sensor 25, a rear sensor 26, a pressing member 27, discharge rollers 28, and a path-switching plate 29.

The feeding roller 20 contacts the sheets G loaded in the sheet tray 2. When the feeding roller 20 rotates, friction is generated between the feeding roller 20 and the sheets G, by which friction the feeding roller 20 feeds the sheets into the main body 3. The separating pad 21 applies a frictional force to the sheets G in order that the feeding roller 20 can separate one sheet G from the plurality of sheets. Hence, these components separate the sheets G loaded in the sheet tray 2 in order that one sheet is fed at a time into the main body 3.

Figure 1:
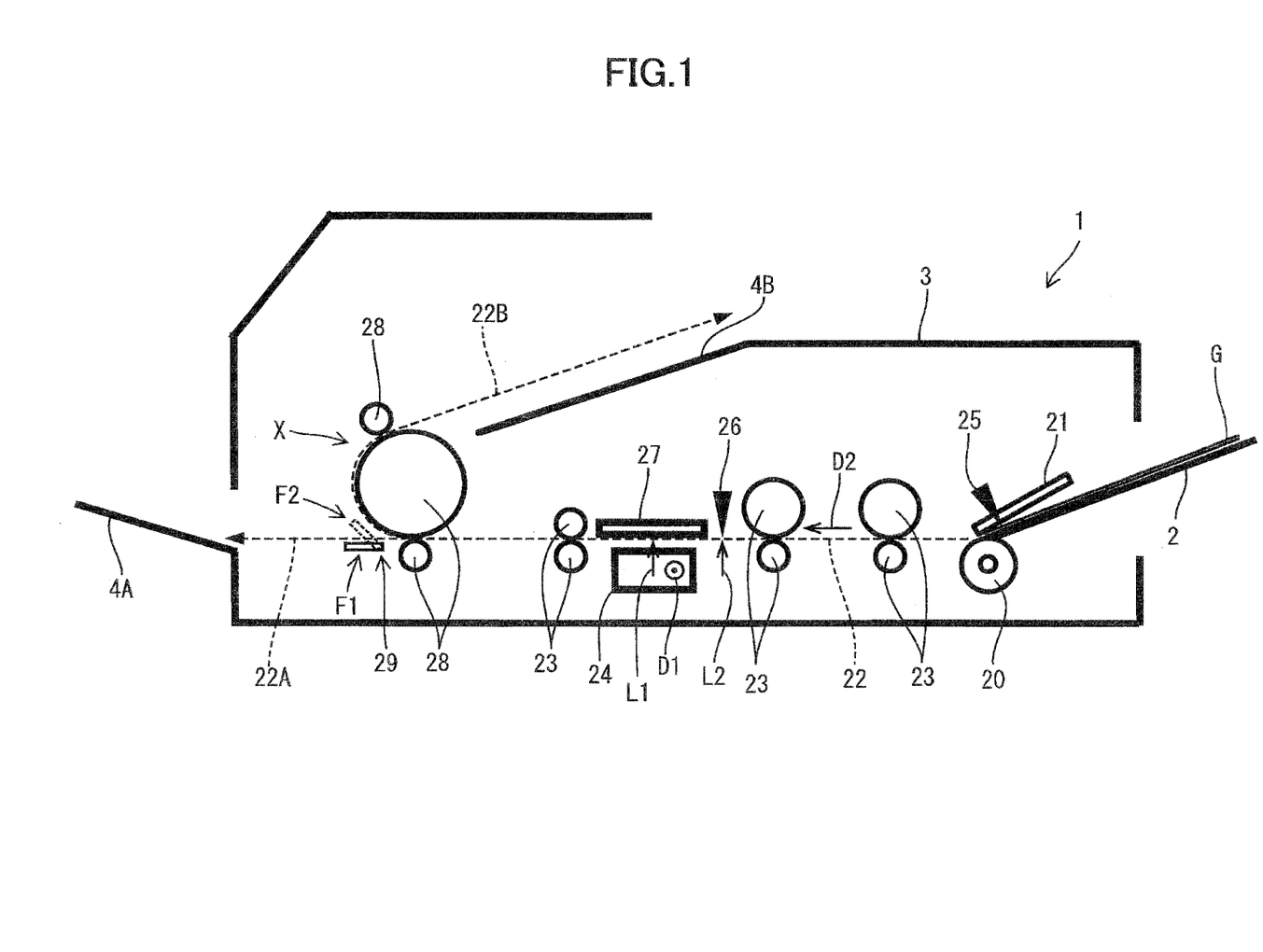
FIG. 1 is a schematic cross-sectional view showing a general structure of an image-reading device according to first and second embodiments of the present invention.
Figure 2:
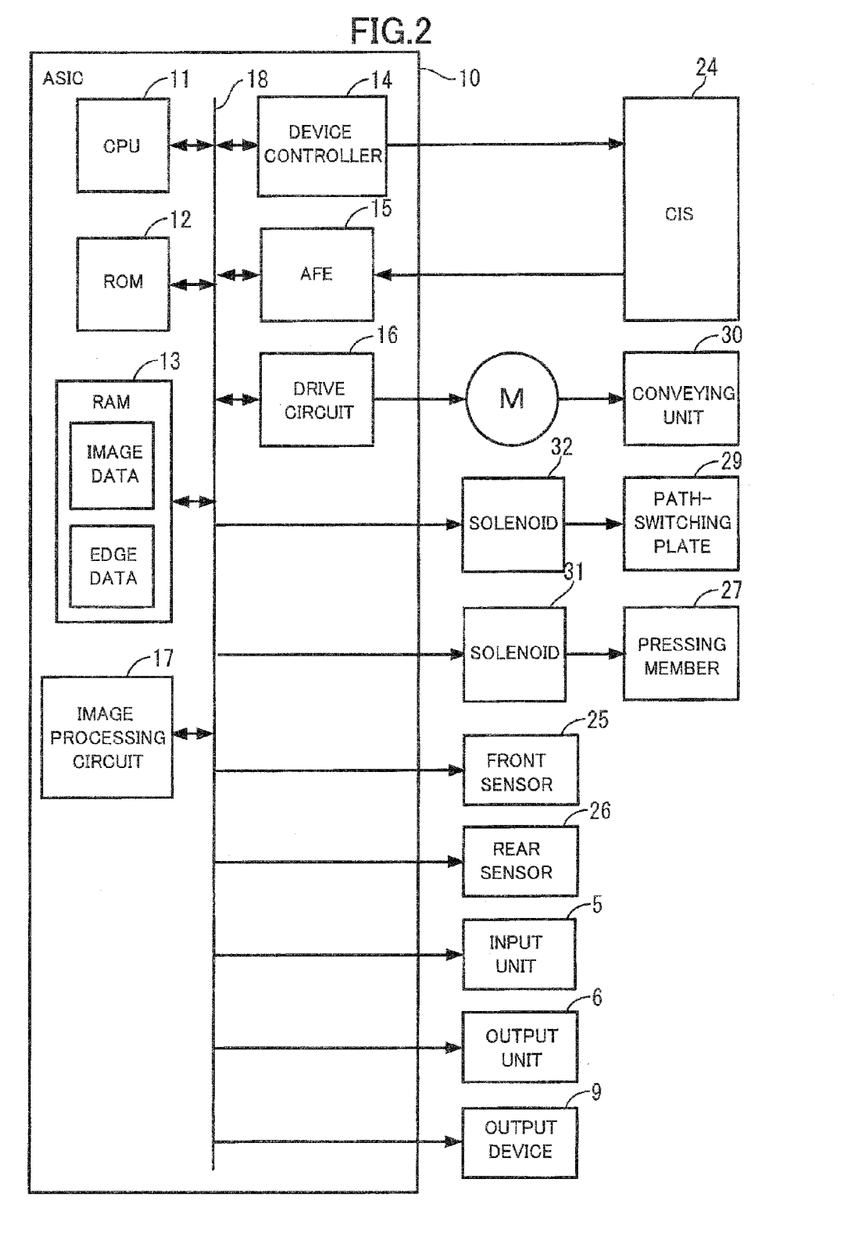
FIG. 2 is a schematic block diagram showing an electrical configuration of the image reading device according to the first and second embodiments.
Figure 3:
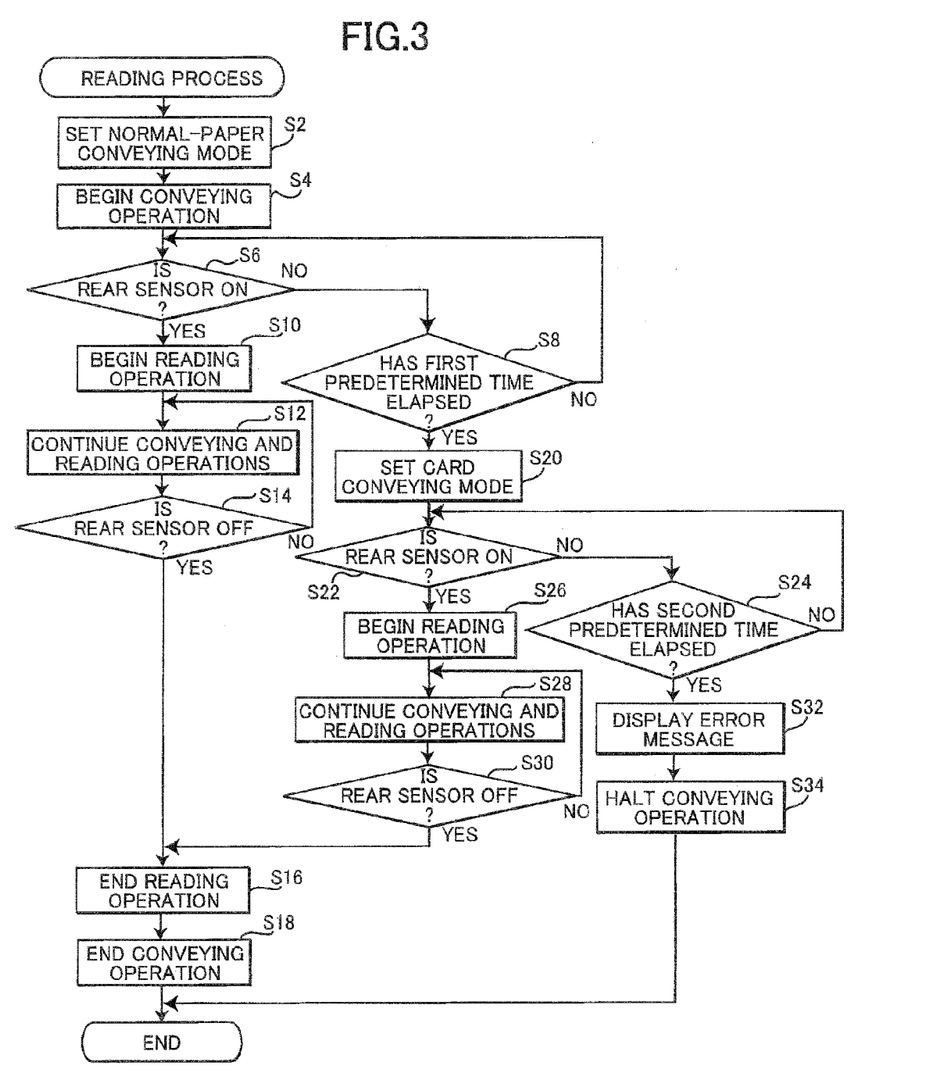
FIG. 3 is a flowchart showing a reading process according to the first embodiment.

The image-reading device 1 further includes a motor M for driving the conveying rollers 23 to rotate (see FIG. 2). When driven, the conveying rollers 23 convey sheets G of the original that have been fed into the main body 3 along the paper-conveying path 22 in a conveying direction D2. The CIS 24 is disposed on the paper-conveying path 22 for reading the sheets G that pass through a reading position L1. The CIS 24 reads the sheets G by scanning in a reading direction referred to as a main scanning direction D1, which is orthogonal to the conveying direction D2 in which the sheets G are conveyed along the paper-conveying path 22. The pressing member 27 is disposed at a position on the other side of the paper-conveying path 22 from the CIS 24 and confronts the CIS 24. The pressing member 27 is pressed toward the CIS 24 by a solenoid 31 (see FIG. 2). With this configuration, the pressing member 27 can press the sheet G being conveyed past the reading position L1 toward the CIS 24 so that the sheet G does not float off the CIS 24.

As with the conveying rollers 23, the motor M also drives the discharge rollers 28. When receiving sheets G conveyed along the paper-conveying path 22, the discharge rollers 28 convey the sheets G onto one of the discharge trays 4. The path-switching plate 29 is disposed at a position confronting the discharge rollers 28 from the other side of the paper-conveying path 22. The path-switching plate 29 is controlled by a solenoid 32 (see FIG. 2) to switch between a first orientation F1 and a second orientation F2. In the first orientation F1, the path-switching plate 29 is aligned with a first conveying path 22A of the paper-conveying path 22 that leads to the discharge tray 4A. In the second orientation F2, the path-switching plate 29 is aligned with a second conveying path 22B that leads to the discharge tray 4B.

The first conveying path 22A and second conveying path 22B share a shared section of the paper-conveying path 22 extending from the sheet tray 2 to the discharge rollers 28 and, hence, also share the reading position L1 and a detection position L2 described later.

Where the first and second conveying paths 22A and 22B differ is the shared section of the paper-conveying path 22 extending from the discharge rollers 28 to the discharge tray 4A and discharge tray 4B. In this region, the first conveying path 22A is formed substantially linear, while a portion of the second conveying path 22B is curved to conform to the discharge rollers 28. Hence, the radius of curvature of the second conveying path 22B at a portion X around the discharge rollers 28 is smaller than that of the first conveying path 22A. In other words, the second conveying path 22B has a curved portion with a radius greater than a radius of a portion of the first conveying path 22A other than the shared section.

When the path-switching plate 29 is in the first orientation F1, indicated by a solid line in FIG. 1, sheets G are conveyed along the first conveying path 22A and discharged onto the discharge tray 4A. On the other hand, when the path-switching plate 29 is in the second orientation F2, indicated by a dotted line in FIG. 1, sheets G are conveyed along the second conveying path 22B and discharged onto the discharge tray 4B. The feeding roller 20, conveying rollers 23, and discharge rollers 28 together constitute a conveying unit 30 functioning to convey sheets G loaded in the sheet tray 2 along the paper-conveying path 22.

The front sensor 25 is disposed on the sheet tray 2 and is configured to be on when a sheet G of the original is loaded in the sheet tray 2, and off when a sheet G of the original is not loaded in the sheet tray 2. The rear sensor 26 is disposed on the path-switching plate 29 at a detection position L2 upstream of the CIS 24. The rear sensor 26 is configured to be on as a sheet G of the original passes past the detection position L2 along the paper-conveying path 22, and to be off when a sheet G of the original is not present at the detection position L2. The main body 3 is additionally provided with an input unit 5, an output unit 6, an output device 9, and the like (see FIG. 2). The input unit 5 includes a power switch and various buttons that receive operations and commands from the user. The output unit 6 is configured of LED lights for indicating the status of the image-reading device 1. The output device 9 is a connector for USB memory or the like, enabling a user to export images of sheets G scanned by the CIS 24 out of the image-reading device 1.

2. Electrical Structure of the Image-Reading Device

As shown in FIG. 2, the image-reading device 1 includes an application-specific integrated circuit (ASIC) 10 that controls the components of the image-reading device 1. The ASIC 10 includes a central processing unit (CPU) 11, a ROM 12, a RAM 13, a device controller 14, an analog frontend (AFE) 15, a drive circuit 16, and an image-processing circuit 17. Solenoids 31, 32 and the like are connected to these components via a bus 18.

The ROM 12 stores various programs for controlling operations of the image-reading device 1. The CPU 11 controls the components of the image-reading device 1 based on programs read from the ROM 12. The device controller 14 is connected to the CIS 24 and transmits signals to the CIS 24 for controlling a scanning operation based on commands received from the CPU 11. The CIS 24 reads the sheet G over a scanning region H (see FIG. 6) based on the signals received from the device controller 14 and outputs the scan data to the AFE 15.

The AFE 15 is connected to the CIS 24 and functions to convert scan data outputted from the CIS 24 as an analog signal into gradation data as a digital signal based on commands from the CPU 11. The AFE 15 converts scan data outputted from the CIS 24 to image data to be stored in the image-reading device 1 or to be exported from the image-reading device 1 and extracts edge data for identifying the region of the original image read from the sheet G. The AFF 15 stores the image data and edge data in the RAM 13 via the bus 18. The image-processing circuit 17 detects the edges of the region constituting the original image based on the edge data stored in the RAM 13 to calculate the width of the sheet G in the main scanning direction D1.

The drive circuit 16 is connected to the motor M and transmits a pulse signal to the motor M in response to commands from the CPU 11. The motor M rotates in response to the pulse signal inputted from the drive circuit 16, and the rotation of the motor M drives the conveying unit 30 to convey a sheet G along the paper-conveying path 22 in steps. That is, the CPU 11 transmits a pulse signal to the motor M via the drive circuit 16 for conveying a sheet G, and the conveying unit 30 conveys the sheet G in response. By varying the number of pulse signals transmitted to the motor M per unit time, the drive circuit 16 can modify the driving speed of the motor M in order to change the conveying speed for the sheet G. The drive circuit 16 can switch the conveying speed for the sheet G at least between a first velocity V1 and a second velocity V2 slower than the first velocity V1. Hereinafter, the number of pulses in the pulse signal transmitted from the drive circuit 16 to the motor M will be referred to as the "step number."

The solenoid 31 is connected to the pressing member 27 and functions to press the pressing member 27 toward the CIS 24 in response to commands from the CPU 11. The solenoid 31 can modify the force with which the pressing member 27 presses a sheet G conveyed along the paper-conveying path 22 toward the CIS 24. Specifically, the solenoid 31 can switch the force of pressure applied to the sheet G between at least a first pressure P1 and a second pressure P2 lower than the first pressure P1. The solenoid 32 is connected to the path-switching plate 29 and functions to switch the path-switching plate 29 between the first orientation F1 and second orientation F2 in response to commands from the CPU 11.

3. Reading Process

Next, a reading process performed by the CPU 11 for using the CIS 24 to read a sheet G will be described with reference to FIG. 3.

The CPU 11 begins the reading process after confirming the front sensor 25 that a sheet G is set in the sheet tray 2 and after a read command for reading the sheet G has been inputted on the input unit 5.

In S2 at the beginning of the reading process, the CPU 11 sets a conveying mode of the image-reading device 1 to a normal-paper conveying mode. In setting this conveying mode, the CPU 11 sets the conveying velocity for the sheet G to the first velocity V1, sets the pressure applied by the pressing member 27 to the first pressure P1 using the solenoid 31, and sets the path-switching plate 29 to the second orientation F2 using the solenoid 32.

After setting the conveying mode, in S4 the CPU 11 begins conveying a sheet G and measures an elapsed time T from the beginning of conveyance. In S6 the CPU 11 monitors the rear sensor 26 to determine whether the rear sensor 26 is on and, while the rear sensor 26 remains off, in S8 monitors the elapsed time T to determine whether a first prescribed period of time has elapsed. The first prescribed period of time is set by adding a small margin to the time obtained by dividing the distance in the conveying direction D2 between the sheet tray 2 and detection position L2 by the first velocity V1. When the CPU 11 determines that the rear sensor 26 has turned on before the first prescribed period of time has elapsed (S6: YES, S8: NO), then the CPU 11 determines that the sheet G is paper or a similar medium that is relatively easy to convey and scans the sheet G while maintaining the conveying mode as the normal-paper conveying mode.

In S10, the CPU 11 waits until a first step number ST1 has been counted after the rear sensor 26 was turned on, then initiates an operation to read the sheet G. In S12 the CPU 11 continues reading the sheet G while conveying the same. In S14 the CPU 11 determines whether the rear sensor 26 is off and continues the above operation in S12 while the rear sensor 26 remains on (S14: NO). When the rear sensor 26 turns off (S14: YES), in S16 the CPU 11 waits until a second step number ST2 has been counted and ends the operation to read the sheet G. In S18 the CPU 11 waits until a third step number ST3 has been counted, indicating that the sheet G has been conveyed onto the discharge tray 4B, and ends the operation to convey the sheet G, ending the reading process. The first step number ST1 and second step number ST2 are set based on the distance in the conveying direction D2 between the detection position L2 and reading position L1 and a scanning region H of the sheet G. The third step number ST3 is set based on the distance along the second conveying path 22B between the reading position L1 and the discharge tray 4B and the scanning region H of the sheet G.

On the other hand, if the elapsed time T reaches the first prescribed period of time before the rear sensor 26 turns on (S6: NO, S8: YES), the CPU 11 determines that the sheet G is a plastic card or other medium that is relatively difficult to convey. Accordingly, in S20 the CPU 11 changes the conveying mode to a card conveying mode and continues conveying the sheet G. To change the conveying mode, the CPU 11 switches the conveying velocity for the sheet G to the second velocity V2, drives the solenoid 31 to change the pressure of the pressing member 27 to the second pressure P2, and drives the solenoid 32 to switch the path-switching plate 29 to the first orientation F1.

After changing the conveying mode, in S22 the CPU 11 begins monitoring the rear sensor 26 to determine whether the rear sensor 26 is on and, while the rear sensor 26 remains off, in S24 monitors the elapsed time T to determine whether a second prescribed period of time longer than the first prescribed period of time has elapsed. The second prescribed period of time is set by adding the time obtained by dividing the distance in the conveying direction D2 between the sheet tray 2 and detection position L2 by the second velocity V2 to the first prescribed period of time and further adding a small margin. If the rear sensor 26 turns on before the second prescribed period of time has elapsed (S22: YES, S24: NO), then the CPU 11 reads the sheet G while the conveying mode remains set to the card conveying mode. The process of reading the sheet G in the card conveying mode (S26-S30, S16) is identical to the process of reading the sheet G in the normal-paper conveying mode (S10-S16) and a description of this process will not be repeated. After reading the sheet G, the CPU 11 waits until the third step number ST3 has been counted, indicating that the sheet G has been conveyed onto the discharge tray 4B, then in S18 ends the operation to convey the sheet G, thereby ending the reading process.

However, if the elapsed time T reaches the second prescribed period of time before the rear sensor 26 turns on (S22: NO, S24: YES), then the CPU 11 determines that an abnormality has occurred, such as the sheet G becoming jammed in the paper-conveying path 22. Accordingly, in S32 the CPU 11 outputs an error message via the output unit 6 to notify the user that an abnormality has occurred, and in S34 halts the conveying operation for the sheet G, thereby ending the reading process.

4. Effects of the First Embodiment (1) The image-reading device 1 of the first embodiment described above reduces the conveying velocity for a sheet G currently being conveyed when the sheet G is a medium that is relatively difficult to convey, such as a plastic card. Since the torque that can be applied to the sheet G is increased by reducing the conveying velocity, the image-reading device 1 can reliably convey sheets G of the original that are relatively more difficult to convey. Further, unlike conventional devices, the image-reading device 1 need not increase the amount of current used for conveying the sheets G in order to increase the torque to the required level, thereby suppressing an increase in the amount of energy consumed and the amount of heat generated during the conveying operation.

(2) The image-reading device 1 reduces the amount of pressure that the pressing member 27 applies to the sheet G being conveyed when the sheet G is a medium that is difficult to convey. Since the torque required to convey the sheet G is reduced by decreasing the pressure applied to the sheet G, the image-reading device 1 can reliably convey sheets G of original that are more difficult to convey.

(3) The image-reading device 1 switches the position of the path-switching plate 29 so as to convey the sheet G along the first conveying path 22A, which has no curved section, when conveying sheets G that are more difficult to convey. Conveying the sheet G along the first conveying path 22A reduces the amount of torque required to convey the sheet G. Hence, the image-reading device 1 can reliably convey sheets G that are typically more difficult to convey.

Second Embodiment

Figure 4:
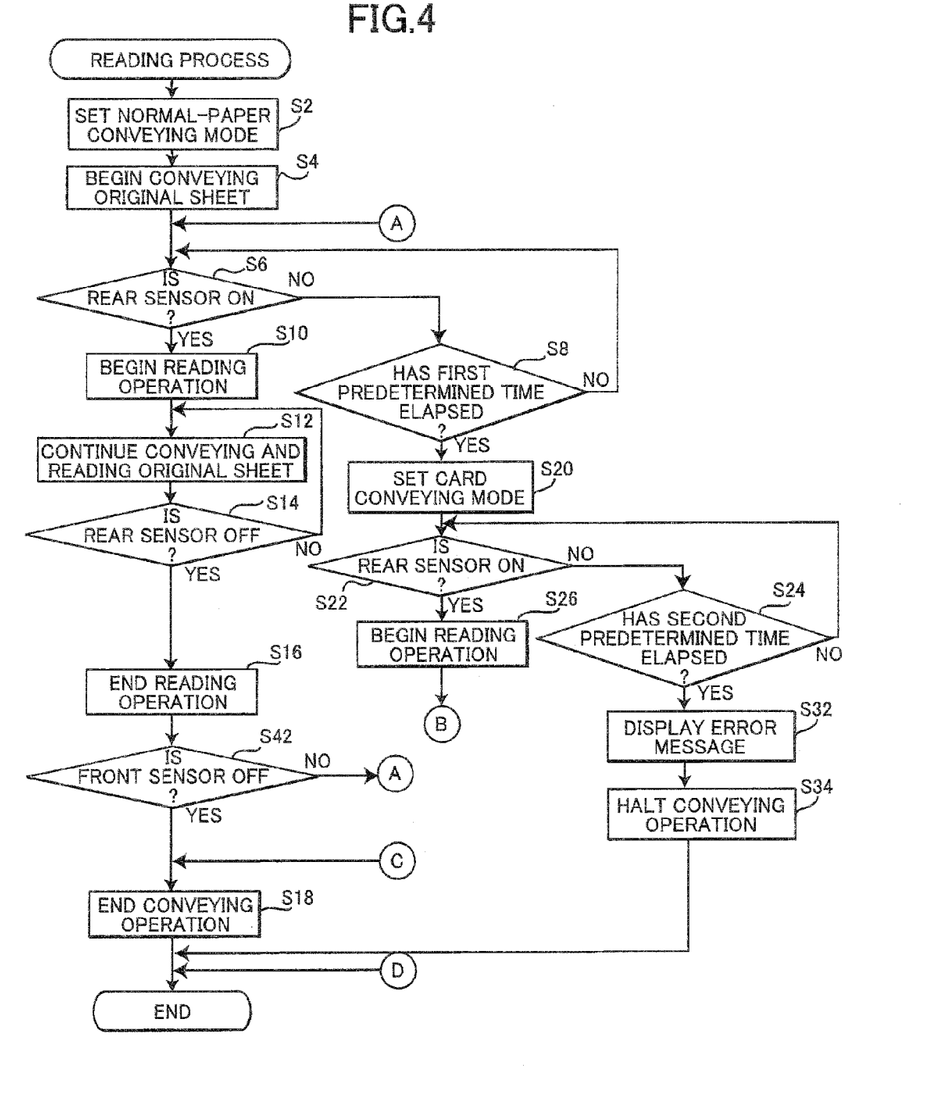
FIGS. 4 and 5 are flowcharts showing a reading process according to the second embodiment.
Figure 5:
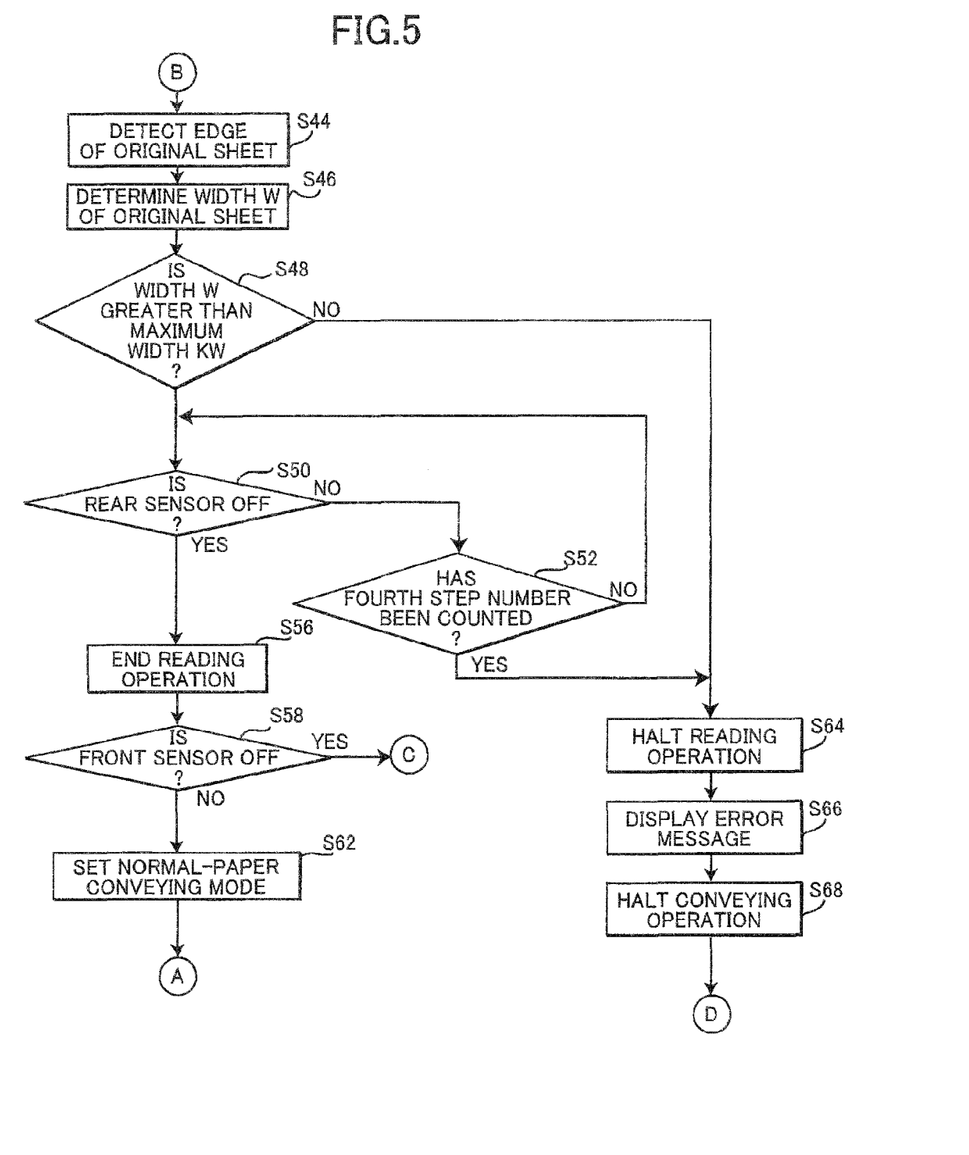

Next, a second embodiment will be described with reference to FIGS. 4 and 5, wherein like parts and components are designated with the same reference numerals and like steps are designated with the same step numbers to avoid duplicating description. The second embodiment differs from the first embodiment in that the image-reading device 1 continuously conveys and reads a plurality of sheets G of original loaded in the sheet tray 2. The plurality of sheets G may include sheets G of different types, and the different types of sheets G may include sheets G that cannot be conveyed along the paper-conveying path 22. Hence, unlike the image-reading device 1 described in the first embodiment, the image-reading device 1 according to the second embodiment must determine whether an sheet G can be conveyed for each of the sheets G to be continuously conveyed.

1. Reading Process

After starting the reading process and initiating conveyance of an sheet G in S4, the CPU 11 begins conveying the bottommost sheet G of the original resting directly on the sheet tray 2 from among the plurality of sheets G loaded in the sheet tray 2. By providing the feeding roller 20 with a one-way clutch, the CPU 11 can form a gap between consecutively conveyed sheets G, the timing to begin conveying a successive sheet G, i.e., for beginning to apply a conveying force to the next sheet G, is set as a design value based on the size of the sheets G, and particularly the length of the current sheet G in the conveying direction D2. The length of the sheet G in the conveying direction D2 is found by multiplying the conveying velocity (either the first velocity V1 or the second velocity V2) by the duration in which the rear sensor 26 is on. Hence, the timing for initiating conveyance of the next sheet G can be found from the length of the current sheet G. Accordingly, by measuring the elapsed time T from the moment conveyance began, the CPU 11 can measure an elapsed time TN from the initial point of conveying each sheet G.

If the rear sensor 26 turns on while the image-reading device 1 is reading a sheet G of original before the elapsed time TN reaches the first prescribed period of time (S6: YES, S8: NO), the CPU 11 executes the process to read a sheet G in the normal-paper conveying mode (S10-S16). After reading the sheet G, in S42 the CPU 11 determines whether the front sensor 25 is on. If the front sensor 25 is off (S42: YES), in S18 the CPU 11 waits until the third step number ST3 has been counted before halting conveyance of the sheet G, ending the reading process. However, if the front sensor 25 is on (S42: NO), the CPU 11 repeats the process from S6 described above.

On the other hand, if the first prescribed period of time elapses before the rear sensor 26 turns on (S6: NO, S8: YES), in S20 the CPU 11 changes the conveying mode to the card conveying mode. If the rear sensor 26 turns on before the elapsed time TN reaches the second prescribed period of time (S22: YES, S24: NO), then the CPU 11 determines that the sheet G can be read and conveyed along the paper-conveying path 22 in the card conveying mode.

In S26 the CPU 11 waits until the first step number ST1 has been counted after the rear sensor 26 turned on before beginning to read the sheet G. In S44 of FIG. 5, the CPU 11 begins by reading a leading-edge scanning region SH of the scanning region H using the drive circuit 16, as illustrated in FIG. 6, then executes an edge detection process on edge data for the leading-edge scanning region SH using the image-processing circuit 17.

Figure 6:
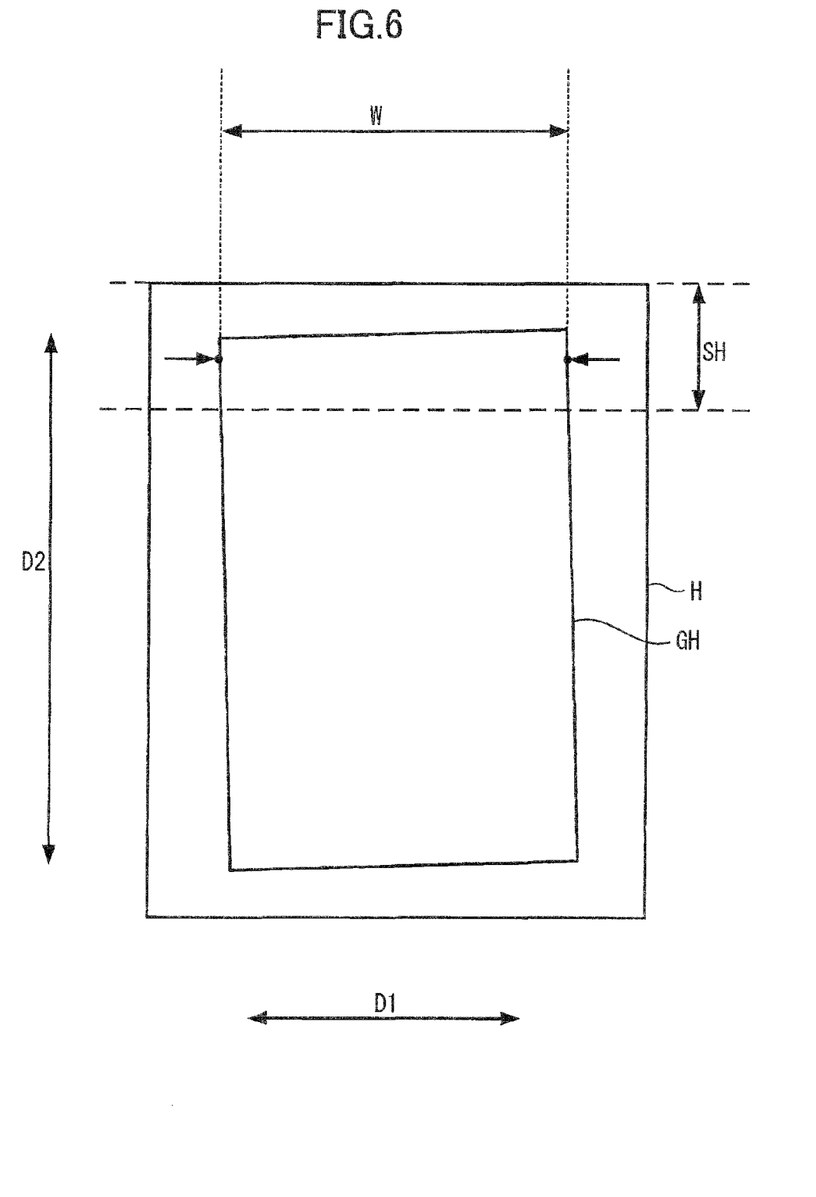
FIG. 6 is a schematic diagram explaining an edge detection according to the second embodiment.

As shown in FIG. 6, the scanning region H for scanning the sheet G is set larger than the actual size of the sheet G in order to ensure that the sheet G is read without image loss, even while the sheet G being conveyed is skewed. Accordingly, the scanning region H for the sheet G includes a reading region GH in which the sheet G was read. The CPU 11 executes an edge detection process on edge data in the leading-edge scanning region SH to detect the edges of the reading region GH on both sides in the main scanning direction D1. Image processing techniques known in the art may be used to detect the edges of the reading region GH from the edge data. A description of these techniques will not be provided herein.

In S46 the CPU 11 determines a width W of the sheet G. Specifically, the CPU 11 calculates the distance between side edges of the reading region GH detected in the edge detection process and sets the width W of the sheet G to this distance.

The CPU 11 may also execute a process to detect skew based on the edge data and calculated the width W of the sheet G from the above distance and the skew in the sheet G when such skew is detected.

In S48 the CPU 11 compares the width W found in S46 to a predetermined threshold width KW. The threshold width KW is a reference value that indicates the maximum width of a sheet G that can be conveyed along the first conveying path 22A. If the width W is greater than the threshold width KW (S48: YES), in S64 the CPU 11 halts reading of the sheet G. In S66 the CPU 11 outputs an error message via the output unit 6, prompting the user to remove the sheet G. In S68 the CPU 11 halts conveyance of the sheet G, ending the reading process.

However, if the width W is within the threshold width KW (S48: NO), the CPU 11 continues reading and conveying the sheet G in S50 and S52: (1) whether the rear sensor 26 has turned off (S50), and (2) whether a fourth step number ST4 equivalent to the maximum size of sheet of original (maximum length) has been counted since the start of the reading operation (S52). Here, the maximum size is the largest size of a sheet G with respect to the conveying direction D2 that can be conveyed along the first conveying path 22A. The fourth step number ST4 is determined based on this maximum size. In other words, the CPU 11 determines a length of a sheet G in the conveying direction D2 based on the step numbers and judges whether or not the length of sheet G is longer than the predetermined maximum length.

If the rear sensor 26 turns off before the fourth step number ST4 has been counted (S50: YES, S52: NO), in S56 the CPU 11 continues to wait until the second step number ST2 has been counted before halting the reading of the sheet G. In S58 the CPU 11 determines whether the front sensor 25 is off. If the front sensor 25 is off (S58: YES), in S18 the CPU 11 waits until the third step number ST3 has been counted and subsequently halts conveyance of the sheet G, ending the reading process.

However, if the front sensor 25 is on (S58: NO), then in S62 the CPU 11 waits until the fifth step number ST5 has been counted, indicating that the sheet G has passed the path-switching plate 29, then changes the conveying mode to the normal-paper conveying mode. Subsequently, the CPU 11 returns to S6 and repeats the process described above.

On the other hand, if the fourth step number ST4 is counted prior to the rear sensor 26 turning off (S50: NO, S52: YES), then the CPU 11 determines that the size of the sheet G is greater than the maximum size. Hence, in S64 the CPU 11 halts reading of the sheet G and in S66 outputs an error message via the output unit 6, prompting the user to remove the sheet G. In S68 the CPU 11 halts conveyance of the sheet G and ends the reading process.

2. Effects of the Second Embodiment

When conveying sheets G of original that take more time to convey, the image-reading device 1 of the second embodiment switches its conveying mode to the card conveying mode. When conveying a plurality of sheets G continuously, some of the sheets G may be nonstandard sheets G that cannot be conveyed along the paper-conveying path 22. If the image-reading device 1 were to convey such sheets G, an abnormal event would occur, such as the sheet G becoming jammed. Not only that, but the abnormal event may cause damage to the image-reading device 1, such as when a plastic card or other nonstandard sheet G becomes stuck in the paper-conveying path 22.

When conveying sheets G that take more time to convey, the image-reading device 1 determines the width W of the sheet G and halts conveyance of the sheet G when determining that the width W is greater than the threshold width KW.

Accordingly, the image-reading device 1 of the second embodiment can suppress the occurrence of paper jams and other abnormalities and can avoid damage to the image-reading device 1.

When conveying sheets G that require more time to convey, the image-reading device 1 detects the size of the sheet G, and specifically the length of the sheet G in the conveying direction D2. The image-reading device 1 halts conveyance of the sheet G when the size is greater than the maximum size. Accordingly, the image-reading device 1 of the second embodiment can suppress the occurrence of abnormalities, such as the sheet G becoming jammed, and the occurrence of damage to the image-reading device 1.

Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

(1) While the present invention is described in the first and second embodiments using the image-reading device 1, the invention is not limited to this embodiment. For example, the present invention may be applied to a multifunction peripheral having at least one of a printer function, a copier function, and a facsimile function for forming images, together with a scanner function.

(2) In the first and second embodiments described above, the image-reading device 1 has a single ASIC 10, and the CPU 11 of the ASIC 10 for executing the reading process. However, the reading process may be executed by a plurality of CPUs, ASICs, and the like, for example.

(3) In the embodiments described above, three items are set/modified when setting/modifying the conveying mode: the speed for conveying the sheet G, the pressure applied by the pressing member 27, and the position of the path-switching plate 29. However, the effects of the embodiments can be obtained when setting or modifying only one or two of these items. Further, rather than two possible selections for each item, three or more selections may be provided for each.

(4) The first conveying path 22A is provided in a generally linear shape in the embodiments, but the first conveying path 22A may be slightly curved toward the discharge tray 4A instead. This shape can stabilize the position of the sheet G being discharged onto the discharge tray 4A. Further, when the first conveying path 22A is formed with a slight curve, the maximum size can be set based on this curve.

What is claimed is:

1. An image reading device comprising:
a sheet setting portion on which a sheet is set;
a conveying unit configured to convey the sheet along a conveying path in a conveying direction at a first predetermined velocity, the conveying path having a reading position and a detection position upstream of the reading position in the conveying direction;
a reading unit disposed on the conveying path and configured to read the sheet being conveyed by the conveying unit at the reading position;
a detecting unit configured to detect the sheet passing past the detection position;
a controller configured to control the conveying unit to initiate conveyance of the sheet, and configured to control the reading unit to start reading the sheet when the detecting unit detects the sheet; and
a pressing member configured to press, toward the reading unit at a first predetermined pressure, the sheet conveyed past the reading position;
wherein the controller is further configured to control the conveying unit to convey the sheet at a second predetermined velocity slower than the first predetermined velocity when the detecting unit fails to detect the sheet after a prescribed period of time has elapsed since the conveying unit initiates the conveyance of the sheet, the prescribed period of time being set based on a duration in which the conveyance of the sheet from the sheet setting portion to the detection position at the first predetermined velocity, and
wherein the controller is further configured to control the pressing member to press the sheet toward the reading unit at a second predetermined pressure lower than the first predetermined pressure when the detecting unit fails to detect the sheet after the prescribed period of time has elapsed since the conveying unit initiates the conveyance of the sheet.

2. The image reading device according to claim 1, wherein the conveying path includes a first conveying path and a second conveying path, the first conveying path and second conveying path sharing a shared portion between the detection position and the reading position, the first conveying path having a remaining portion other than the shared portion, the second conveying path having a curved portion with a radius greater than a radius of the remaining portion,
wherein the conveying unit further includes a switching member configured to switch the conveying path between the first conveying path and the second conveying path,
wherein the controller controls the switching member to switch the conveying path to the first conveying path when the detecting unit fails to detect the sheet after the prescribed period of time has elapsed since the conveying unit initiates the conveyance of the sheet.

3. The image reading device according to claim 1, wherein the controller is configured to determine a length of the sheet in the conveying direction when the detecting unit fails to detect the sheet after the prescribed period of time has elapsed since the conveying unit initiates the conveyance of the sheet;
wherein the controller controls the conveying unit to halt the conveyance of the sheet when the length of the sheet is longer than a predetermined length.

4. The image reading device according to claim 3, wherein the controller is configured to determine the length of the sheet based on a detection result obtained by the detecting unit when the controller controls the conveying unit to convey the sheet at the second predetermined velocity and the detecting unit detects the sheet.

5. The image reading device according to claim 1, wherein the controller is further configured to determine a width of the sheet when the controller controls the conveying unit to convey the sheet at the second predetermined velocity and the detecting unit detects the sheet,
wherein the controller controls the conveying unit to halt the conveyance of the sheet when the width of the sheet is greater than a prescribed width.

6. The image reading device according to claim 5, wherein the controller is configured to determine the width of the sheet based on a detection result obtained by the detecting unit.

7. An image reading device comprising:
a sheet setting portion on which a sheet is set;
a conveying unit configured to convey the sheet along a conveying path in a conveying direction at a first predetermined velocity, the conveying path having a reading position and a detection position upstream of the reading position in the conveying direction;

a reading unit configured to read the sheet being conveyed by the conveying unit at the reading position;

a detecting unit configured to detect the sheet passing past the detection position;

a controller configured to control the conveying unit to initiate conveyance of the sheet, and configured to control the reading unit to start reading the sheet when the detecting unit detects the sheet;

wherein the controller is further configured to control the conveying unit to convey the sheet at a second predetermined velocity slower than the first predetermined velocity when the detecting unit fails to detect the sheet after a prescribed period of time has elapsed since the conveying unit initiates the conveyance of the sheet, the prescribed period of time being set based on a duration in which the conveyance of the sheet from the sheet setting portion to the detection position at the first predetermined velocity, wherein the conveying path includes a first conveying path and a second conveying path, the first conveying path and second conveying path sharing a shared portion between the detection position and the reading position, the first conveying path having a remaining portion other than the shared portion, the second conveying path having a curved portion with a radius greater than a radius of the remaining portion, wherein the conveying unit further includes a switching member configured to switch the conveying path between the first conveying path and the second conveying path, and wherein the controller controls the switching member to switch the conveying path to the first conveying path when the detecting unit fails to detect the sheet after the prescribed period of time has elapsed since the conveying unit initiates the conveyance of the sheet.

8. An image reading device comprising:

a sheet setting portion on which a sheet is set;

a conveying unit configured to convey the sheet along a conveying path in a conveying direction at a first predetermined velocity, the conveying path having a reading position and a detection position upstream of the reading position in the conveying direction;

a reading unit configured to read the sheet being conveyed by the conveying unit at the reading position;

a detecting unit configured to detect the sheet passing past the detection position;

a controller configured to control the conveying unit to initiate conveyance of the sheet, and configured to control the reading unit to start reading the sheet when the detecting unit detects the sheet;

wherein the controller is further configured to control the conveying unit to convey the sheet at a second predetermined velocity slower than the first predetermined velocity when the detecting unit fails to detect the sheet after a prescribed period of time has elapsed since the conveying unit initiates the conveyance of the sheet, the prescribed period of time being set based on a duration in which the conveyance of the sheet from the sheet setting portion to the detection position at the first predetermined velocity, wherein the controller is configured to determine a length of the sheet in the conveying direction when the detecting unit fails to detect the sheet after the prescribed period of time has elapsed since the conveying unit initiates the conveyance of the sheet, and wherein the controller controls the conveying unit to halt the conveyance of the sheet when the length of the sheet is longer than a predetermined length.

9. The image reading device according to claim 8, wherein the controller is configured to determine the length of the sheet based on a detection result obtained by the detecting unit when the controller controls the conveying unit to convey the sheet at the second predetermined velocity and the detecting unit detects the sheet.

* * * * *